Aug. 9, 1927. 1,638,647
A. M. TAYLOR
ELECTRIC POWER TRANSMISSION SYSTEM
Filed Jan. 11, 1927
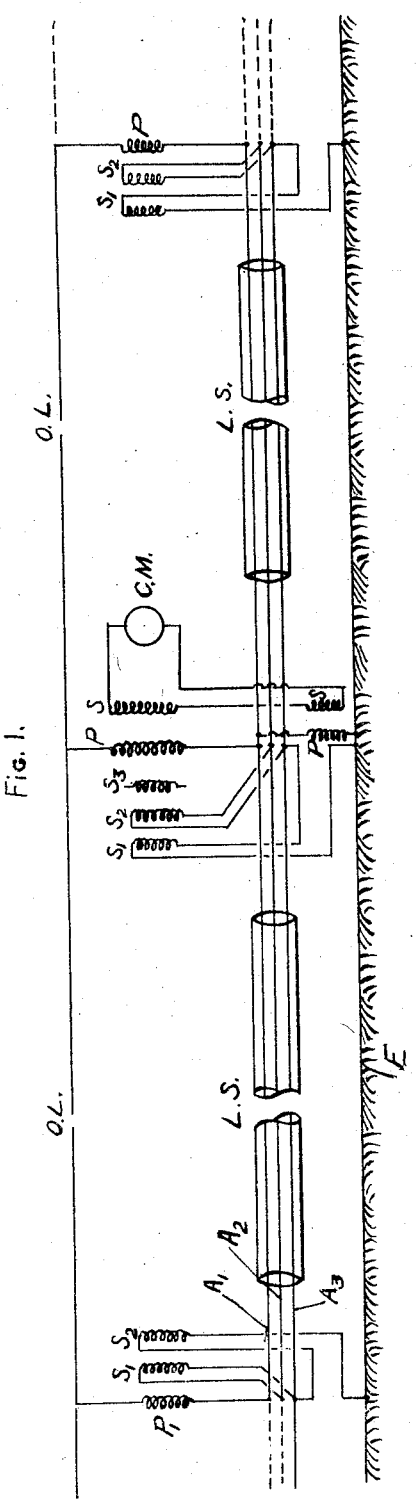
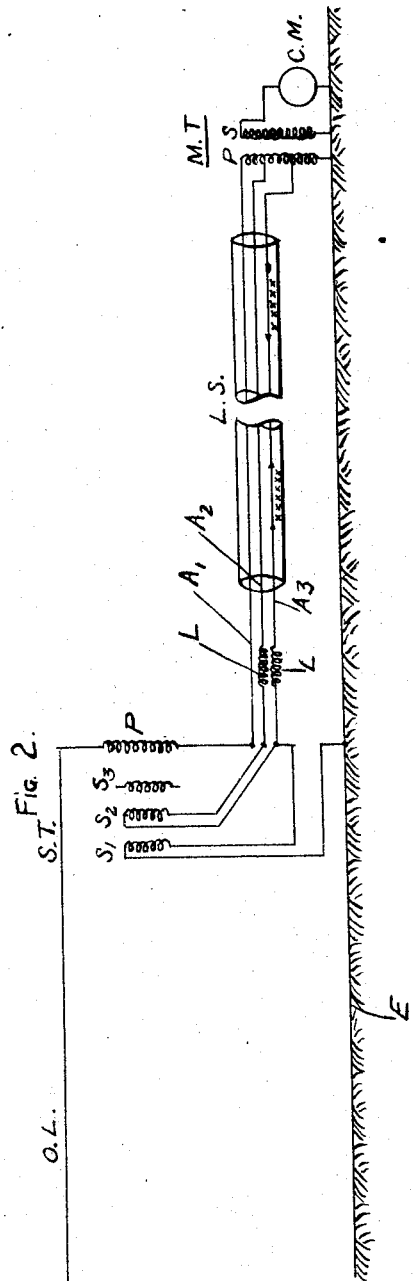
Inventor
Alfred Mills Taylor
By Harold C. Thorne
His Attorney Patented Aug. 9, 1927.

1,638,647

UNITED STATES PATENT OFFICE.

ALFRED MILLS TAYLOR, OF ERDINGTON, BIRMINGHAM, ENGLAND.

ELECTRIC POWER-TRANSMISSION SYSTEM.

Application filed January 11, 1927, Serial No. 160,494, and in Great Britain July 11, 1925.

The present invention is an improvement in, or modification of, the invention claimed in my British Patent No. 232,275, more particularly of that part relating to a combined overhead and underground transmission.

The particular feature introduced in my British Patent No. 232,275 was the transmission of the charging current (or "capacitance" current) required for the intermediate and outermost insulations through the central core of the cable (or, where overhead through a single overhead wire per phase, connected directly or indirectly, with the central core of the cable) at a higher voltage than it would otherwise be transmitted at, and the reduction thereby of the volume of the capacitance current required to be transmitted through the overhead line—or, where the line is exclusively an underground cable, through the intermediate and outermost cores of that cable.

The present invention still retains the feature of the transmission of the capacitance current at the highest possible voltage and its re-distribution at the receiving end at reduced voltages; but its purpose is, while still retaining the above feature, to still further reduce the capacitance current; and also incidentally the load current—by transmitting the same at a voltage considerably above that which even the best designed cable known to the art would be capable of sustaining. It takes account of the fact that, while the underground cable cannot be constructed, under present known methods, for a voltage of operation appreciably above 90,000 volts above earth (150,000 between phases) an overhead line can be constructed having a voltage of 127,000 v. above earth (220,000 between phases); and it seeks to discover means whereby, without transforming the whole of the power to be transmitted (and thereby incurring rather serious loss in operation as well as a quite unnecessary capital outlay), the advantages of the aforesaid great increase in the voltage, in the way of reduction of the capacitance current required to be transmitted for charging the ends of the line, where the latter goes underground, as well as the great reduction in the amount of the power component of the current which has to be transmitted through the overhead line, can be realized.

In particular, the application of the scheme to the equipment of a railway line will be considered and moreover a railway line passing through various large centres of population, such for example as a trunk line from south to north in Great Britain.

In such a line there will, in addition to the regular railway loads, be very large commercial loads dealing with the whole supply of power to the towns through which the line passes. These loads will have a power factor under present circumstances of between 75% and 85% and at this power factor there is a very large lagging wattless component in the current, which represented electromagnetic stored energy. This stored energy tends to supply the cable charging current corresponding to a certain section of the line. If the towns at which this stored energy was available were all of equal size and situated at uniform distances apart, the problem of the supply of the requisite charging currents for the cables would be an easy one—assuming, that is, that the underground cable would be required along the whole length of the line into which it was desired to feed the requisite capacity current.

Unfortunately, however, this is not the case; there are very large centres of population followed by very large gaps where there is no population, and the present inventor has satisfied himself, by a detailed calculation of such a line, that the distances to which it is required to feed the electro-magnetic stored energy (expressed as charging current) would be so great that, on the system proposed in his British Patent No. 232,275, this could not be done, even if a special overhead line were run from any such centre both ways for, say, 50 miles or so, without some auxiliary means. Such auxiliary means might consist of an inductance inserted at the substation (at the town under consideration) between the bus-bar and each of the branches of the overhead line. Such an arrangement would boost up the voltage of the charging current at the said substation; and the pressure in the overhead line which transmitted this charging current backwards towards the main generating station and forwards away from it, would gradually fall until, at the point where it joined up with the underground cable system, it would be at the same potential; as, for example, the potential of the innermost core of the cable system to which it was joined. (It is here assumed, for the moment, that the triple-concentric cables considered in the present inventor's British Patent No. 232,275 are employed; but of course the principle here being discussed could be applied to any single-core underground cable system in the same way).

Such an arrangement, however, would be of rather doubtful utility; because, for instance, the overhead line would be—even at its point of highest potential—operating at a voltage not greatly in excess of that of the underground cable.

If, however, we were to replace the inductances by a primary winding of a transformer, or by an auto transformer, we may at once increase the voltage of the overhead line to, say, 220,000 volts and thereby very greatly reduce both capacitance current and the load current, and by this very fact the potential drops which occured in the passage backwards and forwards of the capacitance current, to the points where the latter was to be fed into the line, are now very greatly reduced, and in addition we are able to put a large portion of the load current into the overhead line at the high pressure.

The overhead line is, moreover, by virtue of the fact that the winding of the transformer is in a "branch" circuit to the overhead line—available for the passage both of "through" load current and of capacitance current for the towns beyond, without either of these currents having to traverse any unnecessary inductance, the importance of which on starting up the line, after a stoppage, may be considerable. By the said arrangement, therefore, we have provided a means whereby each individual large town is able to contribute a lagging component of current sufficient to charge the cable system to great distances from its origin, and in this manner during the ordinary working of the system the transmission of capacitance current from the generating station to the extreme end of the line, perhaps one or two hundred miles away, is avoided. Secondly, the assistance of the overhead line for the transmission, at considerably increased voltage, of the load current is secured; and thirdly the heating of the underground cable, consequent upon the necessary transmission of large charging currents over long distances from the various sub-stations (at the lower voltage) is avoided, and the cable is consequently left free for the passage of larger load currents. Lastly, the advantage of the combination of the underground and overhead system is secured, the underground system being less likely to interruption than the overhead system and acting as a standby to the latter in the event, for example, of its being struck by lightning or by an aeroplane.

The advantages of the utilization of the lagging component of the load at the sub-stations, for the purpose of charging the underground cable would not, however, be available, if there were any risk in so working of "current resonance" coming in and passing currents which were never intended between the inductance in the consumers' motors and the capacitance in the underground cable. The inventor gets over this as follows:—

It is arranged that, at the time of maximum load at a sub-station, such a length of cable on either side of the sub-station will be fed from that substation as will approximately require a current equal to, or somewhat less than, the lagging component of the load current.

When this is so arranged, it follows that every consumer whose load is taken off the system, also thereby removes the equivalent of a parallel reactance from the general sub-station system. The resultant reactance of the sub-station system is thereby increased. Hence it follows that the natural period of oscillation for the whole transmission system falls (and cannot possibly rise). If, for example, the normal periodicity of the system is say 50 cycles per second and if, at this periodicity the amount of lagging load current is properly arranged for, then when, for instance, the load current is quartered by the switching off of consumers' loads, (assuming the said load current to be all a motor current) the equivalent reactance of the load circuit is increased fourfold and, since the natural period of resonance depends upon the square root of the reciprocal of the inductance, it follows that the new "natural" period of resonance becomes one-half—i. e. a half a cycle will cover two half cycles of the fundamental. But half the frequency of oscillation, applied to the cable system, will only pass half the charging current; consequently, instead of there being any tendency to current resonance, the reverse is the case as the load of the sub-station goes off; and therefore the condition is one of perfect safety.

It should be explained that where the overhead line feeds the capacitance current back into the underground cable as for example at a mid point between two substations, or any other suitable points, a sub-station will have to be produced for the purpose of housing the (small) transformer which transforms down the pressure of the capacitance current to that suitable for the core or cores of the underground cable or cables; but, as indicated, the transformer for this purpose need be only quite small, and there need be no automatic switch gear unless considered desirable.

The arrangement described above would apply to a long distance railway transmission where, in order to save unnecessary capital outlay a portion of the load current is arranged to be fed over the overhead line directly from the generating station, in conjunction with a substation, or substations, which feed the capacity current backwards and forwards over their own sections of the line. In the case, however, of an extremely important railway service, it would be necessary to ensure that a possible interruption of the supply on the overhead system will not put the line out of commission, and hence it is desirable that all the load current should be supplied through the underground cable system, leaving only the capacitance current to be dealt with by the overhead line. A breakage in the overhead line would, in this case, only affect the supply of capacitance current to a comparatively short section of the underground cable and the said section could receive its supply partly from a "load" substation and partly from a "dummy" substation without a serious menace to the heating of the said underground cable.

In the case of a long transmission line that is not laid along the railways, as for example where water power is being transmitted over a very long line which terminates for example at the centre of a large town, it is desirable to terminate the overhead line at the outskirts of the aforesaid town and link up with a main substation at the centre of the said town and to do this by means of underground cables, which, in this case may or may not be carried backwards towards the generating station, beyond the limits of the said town, according as to whether the importance of the service and the extent of the load warrants this being done.

In such a case it becomes desirable, as before, to operate the overhead line at the very highest possible voltage (say 220,000 v. between phases) and it also becomes desirable to transform part of the capacitance current at the outskirts of the town and to feed it into the outermost and intermediate insulations of the underground cable.

Also, in order to utilize as far as possible the current-carrying capacity of all the three cores of the triple-concentric cable (if such be used) for the passage of load current and capacitance current to the centre of the town, it is desirable, at the outskirts of the town, to erect a house containing a small transformer and to insert between the overhead line and the innermost core of the underground cable the primary coil of a transformer, whose two or more secondaries can feed both load current and capacitance current, in such proportions as may be desired, along the outermost, intermediate and innermost cores of the underground cable to the main substation, where again the capacitance current may be partly re-distributed as found convenient. The distribution of the capacitance current among the different cores may be facilitated by the employment of inductances inserted between the transformers and the cores, at both ends of the underground cable, in the manner indicated in my British Patent No. 232,275.

Referring now to the drawings, Fig. 1 gives a general view of the electric circuits at a big substation, corresponding with a large town, and including the underground cable and the overhead line in both directions from the said town towards other towns at considerable distances away, such as along a line of railway. It also shews the two feeding points of the overhead line into the underground cable system at the small transformer houses alluded to in the specification.

It also shews the way in which the extremely high voltage of the overhead line is transformed down to the pressure existing in the underground cable and the way in which the capacitance current and the load current taken from the overhead line are converted and sub-divided and fed into the different cores of the underground cable.

Fig. 2 represents the end of an overhead transmission as it arrives at the outskirts of a large town. It represents the electric circuits from this point onwards into a main transformer station in the centre of the town which is connected with the small transformer station at the outskirts of the town by means of underground cables. It also shews how the high pressure current taken from the overhead line (which operates at extremely high pressure) is transformed down and fed into the various cores of the underground cable for the purpose of transmission to the main transformer station in the centre of the town.

Referring now in detail to Figure 1 (O. L.) represents the overhead line, (E) represents a longitudinal section through the surface of the ground parallel with the overhead line, (L. S.) represents the lead sheathing of the cable. $A_1$, $A_2$, $A_3$, represent respectively the innermost, the intermediate and the outermost cores of a triple concentric cable of which L. S. represents the lead sheath. At the principal sub-station (the centre one in the diagram), representing a big town, (P) represents the primary winding of the main transformer and (S) the low tension secondary winding of same (C. M.) represents the motor load of the town, consisting of consumers' motors (C. M.) This motor load has a large lagging component of current which, passing through the secondary winding (S) sets up a lagging current in the primary winding (P) which, being fed into the overhead line (O. L.) is taken into the primary winding (P) of the small transformer, at the half-way transformer house shewn at the left of the figure, and is there fed as a leading current, into the underground cable, being distributed among the different cores of the said underground cable by means of the two secondary coils $S_1$, $S_2$.

Coming back to the main transformer at the principal substation, the three secondary coils $S_1$, $S_2$ and, if desired $S_3$, distribute any capacity current which may be sent from the main generating station along the overhead line (for purposes of charging up the overhead line) suitably among the three cores of the underground cable.

The sub-station shown on the right hand side of the figure is precisely similar in all respects to that shewn on the left hand side and fulfils similar functions, i. e. the lagging component of the current received from the consumers' motors is employed for feeding the right hand section of the underground cable system by means of the extension of the overhead line (O. L.) as shewn.

Moreover, as already indicated earlier in this specification, a "through" current (whether a load current or a capacitance current) can be passed right through the aforesaid main substation to other distant sub-stations situated in similar large towns and also, if at any time the line has to be charged up after an interruption, the capacity current can be sent from the main generating station by means of the overhead line to any of the principal substations desired.

Referring now in detail to Figure 2 (O. L.) is the overhead line, (E) is the longitudinal section through the earth, as in the previous drawing (S. T.) is the small transformer substation at the entrance to a big town where the overhead cable dips underground; P is the primary winding of the aforesaid small transformer (which only deals with a part of the load), and $S_1$, $S_2$, and, if desired $S_3$ are secondary windings employed to transform and distribute both capacitance current and load current into the cores $A_1$, $A_2$ $A_3$ of the underground cable. L. S. is the lead sheathing of the said cable. (L) and (L) are inductances which may be inserted if desired between the transformer and the cores of the cable for the purpose of boosting up the capacity current.

At the centre of the town the main transformer station (M. T.) is equipped with a primary winding (P) divided into three sections and connected with the cores $A_1$ $A_2$ $A_3$ of the underground cable; S is the secondary winding and C. M. is the consumer's motor load, the lagging component of which may be employed to neutralize the leading capacitance current flowing to the underground cable and thus make unnecessary the transference of any capacitance current through the overhead line.

It will be noticed on referring to the conductor $A_3$ that capacitance currents are shewn flowing into this conductor from both ends. This is because the outermost core of the concentric cable takes rather a large capacitance current which it may, or may not, be advisable to transmit through the outer core from left to right. If it is found unsatisfactory to pass it entirely from left to right on account of the large length of underground cable, the current will be passed from the small substation to the big substation through the central core of the cable at a higher pressure and by means of the transformer at the main substation, it will be transformed and fed back at lower pressure into the right hand end of the conductor $A_3$ in the manner indicated. If desired, this may be repeated in connection with the conductor $A_2$.

In all the above diagrams and description, it will be noted that only that part of the circuit is illustrated and described which corresponds to a single-phase with the neutral point earthed. The diagram may therefore apply either to a three-phase system (in which case two other precisely similar phases would be added, each having the neutral point earthed) or they may apply to a two-phase system, or a four-phase system, in which either two circuits at right angles to one another, or four circuits each 90° apart (in each case having a common neutral conductor) would be employed.

Having now particularly described and ascertained the nature of my said invention and in what manner the same is to be performed, I declare that what I claim is:—

1. In a high-tension alternating-current transmission system, transmission conductors including the combination of overhead lines and intersheathed underground cables, means to transmit current through said overhead lines and underground cables at a high voltages on the intersheathed cables and a relatively higher voltage on the overhead lines than the limits possible with the underground cables, and transformers with tappings connecting the overhead lines and cores of the cables for distributing the potentials and adjusting the loads on the individual cores of the cables.

2. In the arrangement of the transmission system claimed in claim 1, a parallel arrangement of conductors including a continuous underground cable and a parallel overhead line, in which the cable and overhead line act as standbys for each other.

3. In a high-tension alternating-current transmission system, transmission conductors including the combination of overhead lines and intersheathed underground cables at intervals along said overhead lines, means to transmit current through said overhead lines and underground cables at high voltages on the intersheathed cables and a relatively higher voltage on the overhead lines than the limits possible with the underground cables, and auto-transformers with tappings connecting the overhead lines and cores of the cables at the ends and midpoints thereof for distributing the potentials and adjusting the loads on the individual cores of the cables, whereby the distance of transmission may be increased and the length of the underground cable may be reduced.

4. In a high-tension alternating-current transmission system, transmission conductors including the combination of overhead lines and intersheathed underground cables, means to transmit current through said overhead lines and underground cables at high voltages on the intersheathed cables and a relatively higher voltage on the overhead lines than the limits possible with the underground cables, transformers with tappings connecting the overhead lines and cores of the cables for distributing the potentials and adjusting the loads on the individual cores of the cables, and means to supply lagging currents to said conductors, including, in addition to lagging currents taken from consumers' loads, compensating reactances for adjustment of said lagging currents.

5. In a high-tension alternating-current transmission system, transmission conductors including the combination of overhead line and intersheathed underground cables at ends and intervals along said line, means to transmit current through said overhead line and intersheathed underground cables at a higher voltage on the overhead line than on the intersheathed underground cables, means to supply lagging currents to said conductors including lagging currents taken from consumer's loads at said ends and intervals along the line and compensating reactances for adjustment of said lagging currents, auto-transformers with tappings and reactances for the triple purpose of connecting ends and midpoints of said intersheathed cables with said overhead line, for adjusting leads on individual cores and distributing potentials on said cores, with the object of increasing the distance of transmission and reducing the length and voltage of the underground cable.

In testimony whereof he affixes his signature.

Dated this 5th day of May, 1926.

ALFRED MILLS TAYLOR.